UNITED STATES PATENT OFFICE.

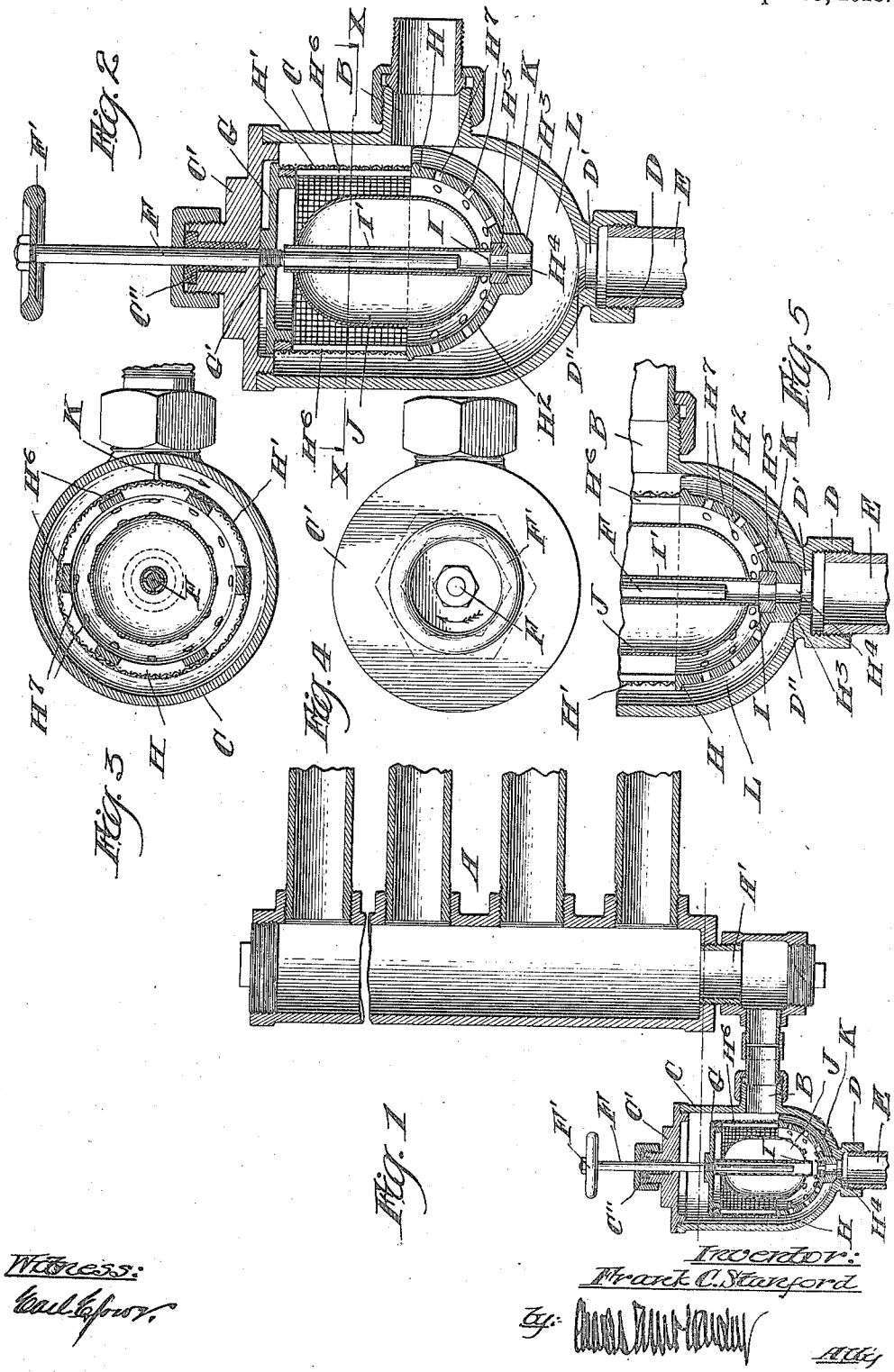

FRANK C. STANFORD, OF CHICAGO, ILLINOIS, ASSIGNOR OF ONE-HALF TO GEORGE C. BRETT, OF CHICAGO, ILLINOIS.

STEAM-TRAP.

1,263,480.

Specification of Letters Patent.

Patented Apr. 23, 1918.

Application filed October 15, 1915. Serial No. 56,134.

*To all whom it may concern:*

Be it known that I, FRANK C. STANFORD, a citizen of the United States, and a resident of Chicago, county of Cook, and State of Illinois, have invented certain new and useful Improvements in Steam-Traps, of which the following is a specification.

My invention relates to improvements in steam traps generally, but has special reference to steam traps of the class used for intermittently discharging the water of condensation from the heating units of steam-heating systems, and the like.

In the operation of such systems much trouble and expense is caused by the clogging of the traps with scale and sediment, hereinafter called "solids", as from the radiators or heating units with which the traps are connected; and as a rule clogged traps can only be cleaned by taking them apart.

The primary object of my invention is to overcome this difficulty by means or devices arranged within the trap itself; so that it shall not be necessary to open the trap; in the sense of dismembering it. A special object of the invention is to provide a trap of such form that the discharge orifice for steam and water, hereinafter called "fluids", shall always be open, and not encroached upon by the accumulation of solids from the connected piping or heating unit. More specifically, my object is to provide a steam trap of the intermittent automatic type that shall be formed to exclude the solids from the "fluids" discharge orifice of the trap and contain means for separately collecting and discharging the "solids" from the trap. A further object is to provide means for positively clearing or scraping the walls of such traps, to insure the complete discharge of the solids when the trap is "opened" to release them. Other incidental objects of my invention will appear hereinafter.

My invention consists generally in a trap which comprises a casing having a suitable inlet opening and in its bottom provided with a "solids" discharge orifice, in combination with a "solids" valve normally closing said orifice, and itself containing a "fluids" discharge orifice, a "fluids" valve normally closing said "fluids" orifice, means for lifting both valves, and a screen movable with the "solids" valve and separating the "fluids" valve from the remainder of the casing, all operable in the manner and for the purposes hereinafter described.

My invention also consists in various novel details of construction and in combinations of parts, also hereinafter described and particularly pointed out in the appended claims.

The invention will be more readily understood by reference to the accompanying drawings, forming part of this specification, and in which:—

Figure 1, is a vertical section of a steam trap embodying my invention, showing also a portion of a steam radiator or heating unit connected therewith.

Fig. 2 is an enlarged vertical section of my novel steam trap, depicting the "solids" valve in raised position;

Fig. 3, is a horizontal section, on the line $x-x$ of Fig. 2;

Fig. 4 is a top view of the valve; and,

Fig. 5 is a sectional detail taken from Fig. 2 and showing both the "solids" valve and the "fluids" valve in closed positions.

Referring to Fig. 1, A is typical of an ordinary steam radiator, having an outlet, A', that is connected with the inlet, B, and the steam trap casing, or body, C. The casing has a return pipe connection, D, at the bottom, by which it is joined to the return pipe, E, of the heating system. The duty of the trap is to maintain a constant and clear vacuum or return connection between the return pipe, E, and the radiator, and to intermittently discharge the water of condensation that collects in the radiator, A. In lieu of the faulty constructions in common use within the casing of the trap, I substitute parts which provide for the reliable performance of its duties and at the same time provide for the separation of the "solids" from the "fluids" and for the effective clearing of the trap as often as may be desired, without in any manner dismembering the trap.

I prefer that the bottom portion of the casing, C, shall be semi-globular or hoppered, and that the inlet shall be above that portion. The bottom contains a large orifice, D', shaped to form a valve seat, D''. By this orifice the casing is placed in communication with the pipe, E.

Centrally in the cap or head, C', of the casing is a slidable rod or stem, F. The joint around the rod is made tight by a packing gland, C''. As shown, the rod, F, is in axial alinement with the orifice, D', and is free to move toward and from the same. The upper end of the rod has a hand wheel, F', which, as hereinafter explained, is used for raising and lowering the rod and also for rotating it.

Attached to the rod, F, at a point below the head, C', is a disk or inner head, G. The means of rigid attachment may be a screw thread, G'. From the part, G, a screen frame, H, is suspended. The upper part of the frame, H, is covered with wire gauze, H'. The lower part, H², of the screen frame is provided with a central depending boss. This I form into a valve, H³, that fits upon the seat, G''. Within the valve, H³, is a smaller orifice, H⁴, partly formed by a packing ring, H⁵. It will be noted that the lower end of the rod, F, does not reach the orifice, H⁴, but is in line therewith.

A valve, I, is provided for the orifice, H⁴; being supplied, preferably, by the lower end of the tube, I', that loosely fits the lower part of the stem or rod, F. Upon the tube, I', is fixed a small hollow float, J. The tube, I', including the part thereof which forms the valve, I, is of less length than the distance between the ring or seat, H⁵, and the underside of the part, G. The valve, I, and attached float may therefore rise and fall within the screen casing.

If desired, the light frame parts or bars, H⁶, of the screen frame may extend from top to bottom, and there directly join the valve, H³, to the head, G, and rod, F. But I find that the parts work better when the screen has considerable weight and therefore I prefer that the lower part of the screen frame shall be a more solid structure. In such case I preferably provide the lower part of the screen frame or member with a number of small perforations H⁷ to prevent its acting as a float.

On the bottom and side of the screen is a rib, K; curved to fit the bottom surface of the casing, as best shown in Figs. 1 and 5.

As there is no means to normally support either the screen, H, or the float, J, the valves, H³, and, I, normally rest upon respective seats, D'', and H⁵.

I shall hereinafter refer to the orifice, D', as the "solids" orifice;—to the valve, H³, as the "solids" valve;—to the valve, I, as the "fluids" valve;—to the orifice, H⁴, as the "fluids" orifice;—and, to the part, K, as the scraper.

The use and operation of the herein described preferred form of my invention, will be clear to those skilled in the art on a mere reading of the drawings, and may be briefly described, as follows: The normal positions of the valves are depicted in Fig. 5. When water and steam enter the trap casing from the radiator, the fluids pass through the screen; while the solids are held back, upon the outside of the screen, and accumulate in the space, L, between the bottoms of the screen and casing. The steam which enters, finds escape through the upper end of the tube, I, and thence downward through the orifices, H⁴ and D'. The water is held back by the closed "solids" valve, H³, at the "solids" orifice, and by the "fluids" valve, I, at the orifice, H⁴, until the water rises far enough to lift the float, J, and "fluids" valve, I, as shown in Fig. 1. Thereupon all the water above the floor of the screen, discharges through the "fluids" orifice, H⁴, and its then continuation, D'. This action of the float and valve continues intermittently at more or less frequent intervals according to the volume of the water received from the radiator. Obviously, the solids continue to accumulate in the space, L, and are held back by the closed "solids" valve, H³. Occasionally, therefore, the solids should be discharged. To this end the screen (while the "solids" valve, H³, remains on its seat) is rotated within the casing by turning the hand wheel, F'. The rotation of the rod, F, is communicated to the globular screen which is rigidly attached to it; and such rotation of the screen causes the scraper, K, to sweep the bottom of the casing, C, and loosen the solids. Then the screen (and contained parts) including the "solids" valve, H³, may be lifted by means of the hand wheel, F'. The opening of the orifice, D', in this manner allows the solids to be swept therethrough by the water previously accumulated in the casing. The casing having thus been cleared of solids, the valve, H³, is restored to its seat, by the lowering of the hand wheel, F', and the connected parts.

When the described trap is to be used in a pressure system, I substitute an ordinary needle point valve for the tubular or hollow valve, I.

As various modifications of my invention will readily suggest themselves to one skilled in the art, I do not limit my invention to the specific structure herein shown and described, other than as set forth in the appended claims.

Having thus described my invention, I claim as new and desire to secure by Letters Patent:—

1. The improvement herein described, comprising a steam trap casing containing an inlet opening and having in its bottom a "solids" discharge orifice, in combination with a "solids" valve normally closing said orifice and itself containing a "fluids" discharge orifice normally communicating with said "solids" discharge orifice, a "fluids" valve normally closing said "fluids" orifice, a float for lifting said "fluids" valve, means for lifting and rotating said "solids" valve and therewith said "fluids" valve and float, a screen mounted for movement with said "solids" valve and inclosing the "fluids" valve, to exclude solids therefrom, and a casing scraper fixed on said "solids" valve and screen.

2. The improvement herein described, comprising a steam trap casing having a hoppered bottom containing a "solids" discharge orifice, in combination with a "solids" discharge valve normally closing said orifice, a screen formed upon said valve, a "solids" scraper attached to said screen and adapted to sweep the bottom of said casing, said valve containing a "fluids" discharge orifice leading from the interior of said screen, and means for rotating, and lifting, said valve and screen.

In testimony whereof, I have hereunto set my hand this 12th day of October, 1915.

FRANK C. STANFORD.

Copies of this patent may be obtained for five cents each, by addressing the "Commissioner of Patents, Washington, D. C."